United States Patent [19]

Bussard et al.

[11] Patent Number: 4,643,519

[45] Date of Patent: Feb. 17, 1987

[54] WAVELENGTH DIVISION OPTICAL MULTIPLEXER/DEMULTIPLEXER

[75] Inventors: Anne B. Bussard, Salem, Va.; Robert E. Pulfrey, Joppa, Md.

[73] Assignee: International Telephone and Telegraph Corporation, New York, N.Y.

[21] Appl. No.: 873,872

[22] Filed: Jun. 12, 1986

Related U.S. Application Data

[63] Continuation of Ser. No. 538,238, Oct. 3, 1983, abandoned.

[51] Int. Cl.⁴ .................................................. G02B 6/34
[52] U.S. Cl. ................................. 350/96.19; 350/96.15; 370/3
[58] Field of Search ................... 370/1, 3; 350/96.15, 350/96.16, 96.18, 96.19, 96.20

[56] References Cited

U.S. PATENT DOCUMENTS

| | | | |
|---|---|---|---|
| 4,198,117 | 4/1980 | Kobayashi | 350/96.19 |
| 4,274,706 | 6/1981 | Tangonan | 350/96.19 |
| 4,329,017 | 5/1982 | Kapany et al. | 350/96.15 |
| 4,479,697 | 10/1984 | Kapany et al. | 350/96.18 |
| 4,486,071 | 12/1984 | Levinson | 350/96.18 |
| 4,583,820 | 4/1986 | Flamand et al. | 350/96.19 |

FOREIGN PATENT DOCUMENTS

| | | | |
|---|---|---|---|
| 0067972 | 12/1982 | European Pat. Off. | 350/96.15 |
| 0093396 | 11/1983 | European Pat. Off. | |

OTHER PUBLICATIONS

Dianov et al., "Spectral Channel Demultiplexer Utilizing A Planar . . . ", *Sov. J. Quantum Electron*, vol. 11, No. 2, Feb. 1981, pp. 229–231.

Belovolov et al., "Spectral Demultiplexer With A Plate Waveguide", *Soviet J. Quantum Electronics*, vol. 12, No. 2, Feb. 1982, pp. 252–254.

"Wavelength Division Demultiplexers For Single-Mode Systems", *Fiberoptic Technology*, vol. 19, No. 7, Jul. 1983, p. 87.

*Primary Examiner*—John Lee
*Attorney, Agent, or Firm*—John T. O'Halloran; Mary C. Werner

[57] ABSTRACT

A wavelength division multiplexing or demultiplexing optical coupler of the diffraction grating type includes a pure fused silica optical element having a convex spherical surface on one end and a diffraction grating on a portion of its other end. The remaining portion of its other end receives a multiple fiber array for transmitting and receiving the light to be multiplexed or demultiplexed.

11 Claims, 3 Drawing Figures

WAVELENGTH DIVISION OPTICAL MULTIPLEXER/DEMULTIPLEXER

The Government has rights to this invention pursuant to Contract No. F30602-81-C-0189 awarded by the Department of the Air Force.

This application is a continuation of application Ser. No. 538,238, filed Oct. 3, 1983 (now abandoned).

FIELD OF THE INVENTION

This invention relates to optical wavelength division multiplexing or demultiplexing couplers and, more particularly, to such couplers of the diffraction grating type.

BACKGROUND OF THE INVENTION

Diffraction grating couplers used as optical multiplexing or demultiplexing devices take light from the input fiber or fibers, respectively, and couple it back into output fibers or fiber, respectively. These couplers utilize a diffraction grating, that is, an angularly dispersive device, that diffracts away incident collimated light at an angle dependent upon the incidence angle and the wavelength of the incident light. In this way, light can be separated by wavelength and coupled as desired.

There are several types of diffraction grating couplers, one common type using a concave diffraction grating and another common type using a radially graded refractive index (hereafter GRIN) lens with a plane diffraction grating. The concave diffraction grating type device has the advantage of not requiring any light collimating and/or refocusing optics. Its disadvantages are that extremely tight control must be exercised in forming the spherical concave surface and also in forming the grating configuration. Compounding the latter requirement is the fact that the ruling tool used to form the grating must swing through an arc as it traverses the spherical surface. In addition, concave grating type devices have a low diffraction efficiency and can suffer from image astigmatism. The disadvantage of the GRIN lens type device is that it includes an additional optical device to collimate and focus the light.

SUMMARY OF THE INVENTION

This invention overcomes the disadvantages of the two types of diffraction grating couplers noted above by providing a diffraction grating type coupler comprising an elongated optical component formed of light transmitting material. One end of the optical component is formed with a convex surface coated with a reflecting material and a portion of the other end is formed with a diffraction grating which is also coated with a reflecting material. Another portion of the other end is formed so as to receive a fiber array. The shape of the convex surface is such that the path of the light from the convex surface to any fiber in the array is equal to about one focal length.

BRIEF DESCRIPTION OF THE DRAWINGS

For a better understanding of the invention, reference is made to the following description of a preferred embodiment thereof, taken in conjunction with the figures of the accompanying drawing, in which.

DESCRIPTION OF THE PREFERRED EMBODIMENT

Figure 1:
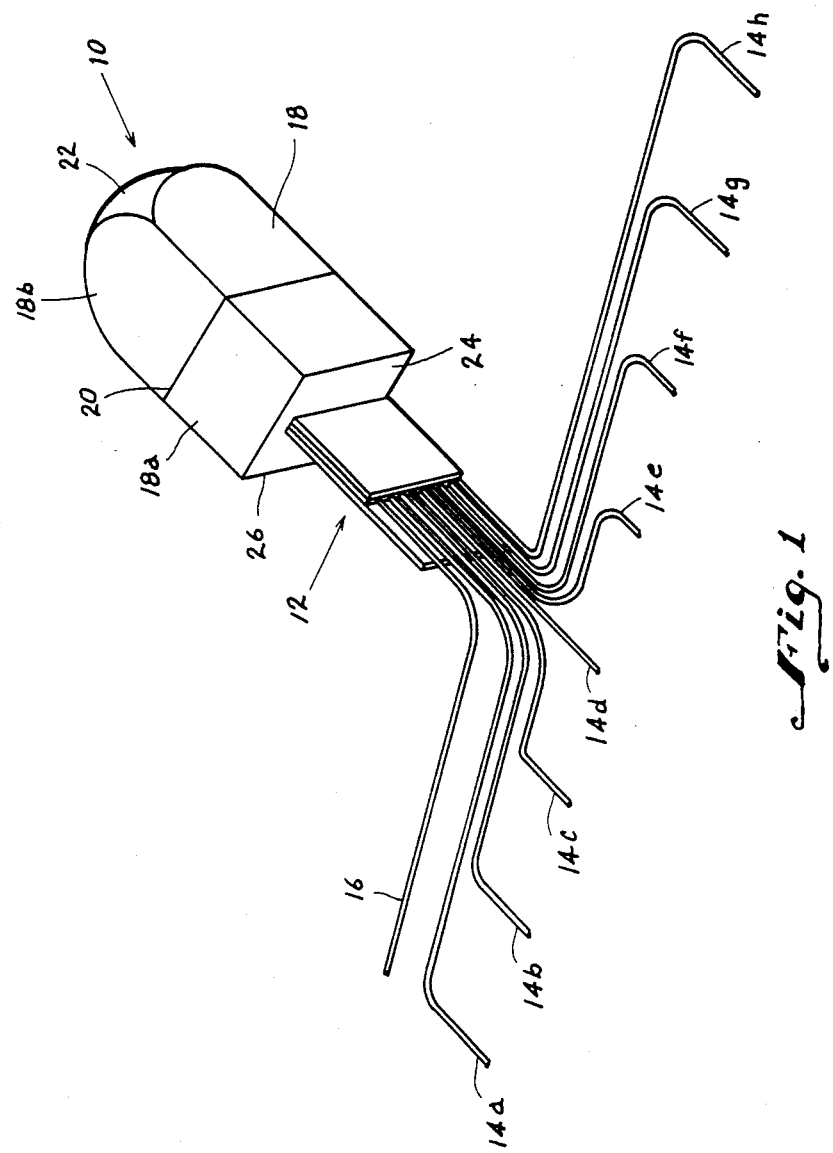
FIG. 1 is a perspective view of a diffraction grating coupler in accordance with this invention.

In FIG. 1 there is illustrated a diffraction grating coupler 10 and a multiple fiber array 12. In this embodiment the coupler 10 is functioning as a multiplexer and, thus, the multiple fiber array includes a plurality of fibers (in this embodiment, eight such fibers) 14a, b, c, d, e, f, g and h, each connected to a light source (not shown), for example, a laser or a light emitting diode. It should be understood that any number of fibers can be included in the array. Each light source provides light at a different wavelength. The light from each fiber is the incident light and is combined by the coupler 10 and coupled into an output or link fiber 16 connected into a fiber optics system. It should be understood that if the coupler 10 is functioning as a demultiplexer, the incident light would include all of the wavelengths and would be transmitted along the fiber 16 to the coupler which would distribute each wavelength to its appropriate fiber 14a through 14h. In this mode, each of the fibers 14a through 14h would be connected to a suitable light detector, for example, an avalanche photodiode or a PIN diode.

Figure 2:
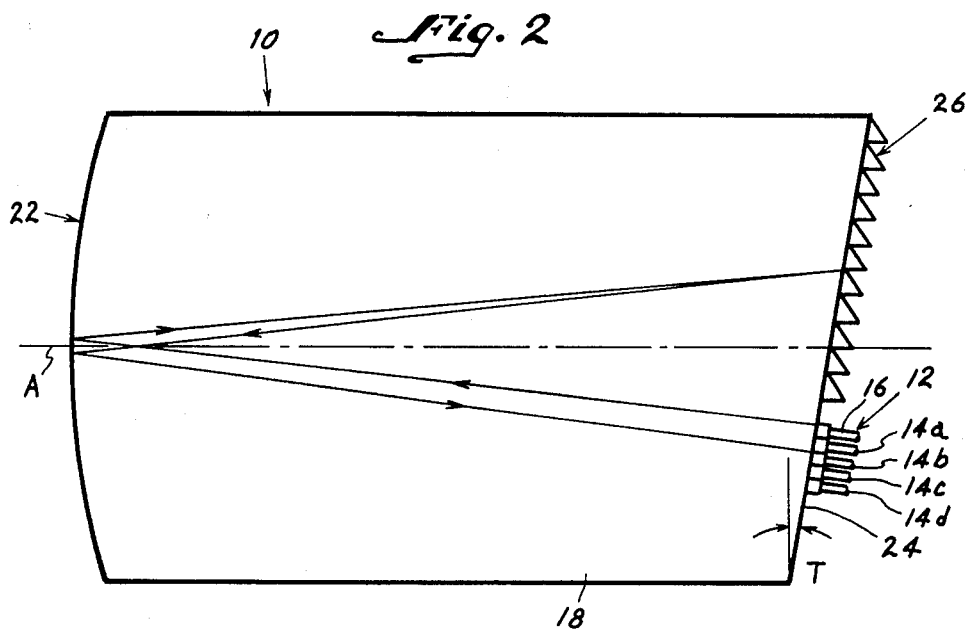
FIG. 2 is a schematic illustration of a diffraction grating coupler in accordance with this invention.

In FIGS. 1 and 2, the coupler 10 can be seen to include an elongated optical component 18 formed of a good light transmitting material. In this embodiment the light transmitting material is glass and is preferably, pure fused silica. Any of various materials can be used and should have a generally uniform index of refraction. As shown in FIG. 1, the optical component 18 has a generally rectangular cross-section, but other shapes are usable.

Figure 3:
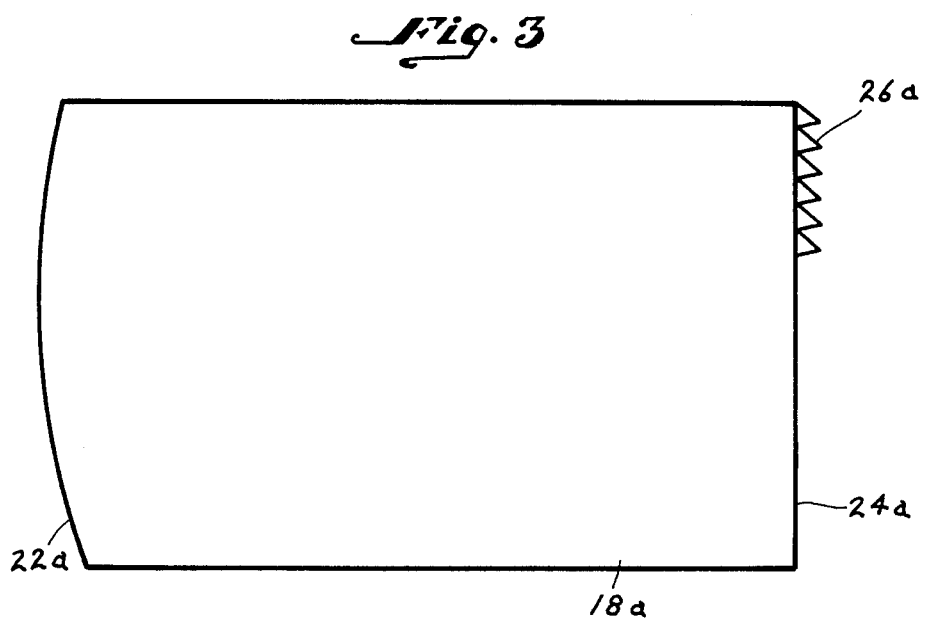
FIG. 3 is a schematic illustration of another diffraction grating in accordance with this invention.

As also shown in FIG. 1, the component 18 is actually two blocks of pure fused silica 18a and 18b having generally planar mating surfaces in abutting relationship. The blocks 18a and 18b are fixed together to form a unitary component. Conveniently the blocks 18a and 18b are fixed together by a good optical grade epoxy 20, i.e., an epoxy that transmits light. The use of two blocks of silica is preferred in some instances since it facilitates the making of coupler 10 as will be clear from later descriptions of the invention. It should be understood that a single block of material could be used as illustrated in FIG. 2 or 3.

One end of the elongated optical component 18 is formed with a convex surface 22 coated with a light reflecting material. Gold or silver are preferred materials coated on the surface 22 and this surface can be formed by any conventional technique. The preferred configuration for surface 22 is spherical where the radius of curvature is such that light emitted from the fiber array into the component 18 travels a path to the surface 22 having a length equal to about one focal length of the light reflecting surface. In this way, the light is collimated by the spherical surface 22. In some cases it may be desirable to have the configuration of surface 22 an aspherical surface, that is, a surface defined by more than one equation in order to minimize aberration. Thus, the term spherical as used herein should be construed to include an aspherical surface.

The other end of the optical component is formed with a generally planar surface 24, one portion of which is formed with a diffraction grating 26. It should be understood that the diffraction grating is a large number of grooves as shown in FIG. 2 of the drawing. It should also be understood that the size of the grooves is greatly exaggerated in FIG. 2 for the sake of clarity. The diffraction grating 26 is also coated with a light reflecting material such as gold or silver. The remaining portion of the planar surface 24 is that portion to which the multiple fiber array 12 is secured. This can also be accomplished by the use of a suitable optical grade epoxy.

The diffraction grating 26 can be formed on the planar end surface 24 by a conventional ruling tool, usually a diamond blade. The diffraction grating can also be formed on a wedge which is epoxied to the planar surface of block 18b with an optical epoxy 20, as shown in FIG. 1. It is preferred, however, to replicate the grating 26 on the end face 24. Replication can be accomplished by coating the one portion of the planar surface 24 with a suitable optical grade resin and pressing a master die having the diffraction grating pattern on its contact surface into the resin while it is still soft enough to form. Thereafter, the resin is cured and coated with the reflecting material in accord with conventional techniques. The use of two blocks 18a and 18b is preferred when the diffraction grating 26 is replicated because handling of the material is facilitated.

Various resins can be used and should have an index of refraction when cured, approximately equal to that of the light transmitting material. Suitable resins are made by Bausch and Lomb, Microscopy and Image Analysis Division, located in Rochester, N.Y.

With reference to FIG. 2, it can be seen that incident light traveling the optical component 10 until it strikes the mirrored spherical surface 22 where it is collimated and reflected through the component to the diffraction grating 26. When the collimated light strikes the diffraction grating 26 it is diffracted back to the mirrored spherical surface 22 where it is reflected and focused into an output fiber.

As shown in FIG. 2, the convex spherical surface 22 is centered with respect to the optical axis A of the component 18. With the surface 22 so centered the planar surface 24 forms an angle T with a line perpendicular to the optical axis. Angle T is approximately equal to one-half the grating incidence angle required for efficient grating operation. In some embodiments, as shown in FIG. 3, it may be desirable to have the planar surface perpendicular to the optical axis of the component. Such a perpendicular surface is shown at 24a in the component 18a. In these embodiments the convex spherical surface 22a should be off-center so that it, in effect, inclines the surface 24 to an effective angle equal to one-half the incidence angle required for efficient grating operation.

The outer surfaces of the component 18, excluding surfaces 22 and 24, may have a ground glass finish to decrease internal scattering from the convex surface 22 and from the diffraction grating 26. The ground glass finished surfaces may be blackened or otherwise treated to enhance their light trapping ability.

While in the foregoing there has been described preferred embodiments of the invention, it should be understood that various changes and modifications can be made without departing from the spirit and scope of the invention.

We claim:

1. An optical coupler comprising an elongated optical component formed of light transmitting material, one end of said component having a convex surface coated with a light reflecting material whereby said convex surface is a light reflecting surface and the other end having a generally planar surface, one portion of said planar surface having a diffraction grating formed thereon and the remaining portion having a section for receiving a multiple fiber array, said planar surface and said convex surface being arranged so that said planar surface is perpendicular to the optical axis of said component and said convex surface is decentered with respect to said axis.

2. An optical coupler in accordance with claim 1 wherein the one portion of the planar surface is coated with a light reflecting material.

3. An optical coupler in accordance with claim 1, wherein said optical component is formed of a material having a generally uniform index of refraction.

4. An optical coupler in accordance with claim 1 wherein said optical component is formed of glass.

5. An optical coupler in accordance with claim 1 wherein the other surfaces of said optical component have a ground glass finish and are coated with materials that enhance their light trapping ability.

6. An optical coupler in accordance with claim 1 wherein said optical component is a single member.

7. An optical coupler in accordance with claim 1 wherein said optical component is two blocks of material joined together by an epoxy.

8. An optical coupler in accordance with claim 1 wherein said one portion of said planar surface includes a resin coating in which said diffraction grating is replicated.

9. An optical coupler in accordance with claim 1 wherein the path of light emitted from a multiple fiber array to said convex surface is approximately equal to the focal length of said convex surface.

10. An optical coupler in accordance with claim 1 wherein said convex surface is spherical.

11. An optical coupler in accordance with claim 1 wherein said convex surface is decentered such that said planar surface is effectively inclined with respect to said convex surface to an angle approximately equal to one-half ($\frac{1}{2}$) the grating incidence angle.

* * * * *